United States Patent
Lawson et al.

(10) Patent No.: US 11,783,122 B1
(45) Date of Patent: Oct. 10, 2023

(54) AUTOMATED TESTING OF TEMPLATES OF A MOBILE MESSAGE

(71) Applicant: Klaviyo, Inc., Boston, MA (US)

(72) Inventors: Michael T. Lawson, Boston, MA (US); Woody Austin, Boston, MA (US); Ally Hangartner, Sarasota, FL (US); Carola Leiva, Boston, MA (US); Nicholas Hartmann, Swampscott, MA (US); Thomas Culp, Cambridge, MA (US); Justin Xu, Boston, MA (US); Maritza Ebling, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 0 days.

(21) Appl. No.: 17/858,218

(22) Filed: Jul. 6, 2022

Related U.S. Application Data

(60) Provisional application No. 63/344,591, filed on May 22, 2022.

(51) Int. Cl.
*G06F 40/186* (2020.01)
*G06Q 30/0201* (2023.01)
*H04W 4/12* (2009.01)

(52) U.S. Cl.
CPC ....... *G06F 40/186* (2020.01); *G06Q 30/0201* (2013.01); *H04W 4/12* (2013.01)

(58) Field of Classification Search
CPC .... G06F 40/186; G06Q 30/0201; H04W 4/12
See application file for complete search history.

(56) References Cited

U.S. PATENT DOCUMENTS

| | | | |
|---|---|---|---|
| 7,533,090 B2 | 5/2009 | Agarwal et al. | |
| 7,752,607 B2 | 7/2010 | Larab et al. | |
| 7,845,950 B2 | 12/2010 | Driscoll et al. | |
| 7,975,000 B2 | 7/2011 | Dixon et al. | |
| 10,503,912 B1* | 12/2019 | Kerr | G01C 21/206 |
| 2012/0191546 A1* | 7/2012 | Phelan | G06Q 30/0269 |
| | | | 705/14.66 |
| 2014/0278747 A1 | 9/2014 | Gumm | |
| 2015/0227962 A1* | 8/2015 | Wical | G06Q 30/0243 |
| | | | 705/14.42 |
| 2016/0117717 A1* | 4/2016 | Moreau | G06Q 30/0245 |
| | | | 705/14.42 |
| 2016/0189176 A1* | 6/2016 | Newnham | G06Q 30/00 |
| | | | 705/7.31 |

(Continued)

*Primary Examiner* — Jennifer N Welch
*Assistant Examiner* — Reji Kartholy
(74) *Attorney, Agent, or Firm* — Brian R. Short

(57) ABSTRACT

Apparatuses, methods, and systems for automated testing of templates of a mobile message. One method includes generating at least a first template of the mobile message and a second template of the mobile message, each of the first template and the second template having at least a different content or a different send time, assigning a respective group of mobile message recipients to the first template of the mobile message and the second template of the mobile message, determining automatically whether the first template of the mobile message has a statistical advantage over the second template of the mobile message through testing, and sending the mobile message of the first template to a remainder of the planned mobile message recipients when the first template of the mobile message is determined to have the statistical advantage over the second template of the mobile message.

23 Claims, 10 Drawing Sheets

(56) References Cited

U.S. PATENT DOCUMENTS

| | | | |
|---|---|---|---|
| 2018/0082326 A1* | 3/2018 | Vlassis | G06Q 30/0242 |
| 2019/0122254 A1* | 4/2019 | Duquette | G06Q 30/0243 |
| 2019/0130333 A1* | 5/2019 | Li | G06Q 10/067 |
| 2020/0319996 A1* | 10/2020 | Mordo | G06F 11/3664 |
| 2020/0327577 A1* | 10/2020 | Truong | G06Q 30/0244 |
| 2021/0109897 A1* | 4/2021 | Brechbuhl | G06F 16/17 |
| 2021/0357952 A1* | 11/2021 | Liu | G06Q 10/107 |
| 2022/0283932 A1* | 9/2022 | Arbour | G06F 16/958 |

\* cited by examiner

Determining the range of values that the N success rates of N different templates could take given a pre-defined level of random chance
410

Comparing a fraction of credible intervals that are overlapping, wherein credible intervals include a range of values that the success rate is likely to fall within after accounting for random chance
420

Checking that these ranges of values indicate a sufficiently higher success rate for the leading variation after accounting for random chance
430

*FIG. 4*

```
┌─────────────────────────────────────────────────────────────────────────────┐
│ Generating, by a server, at least a first template of the mobile message and a second template of │
│ the mobile message, each of the first template and the second template having at least a different │
│                          content or a different send time                                         │
│                                            810                                                    │
└─────────────────────────────────────────────────────────────────────────────┘
                                             │
                                             ▼
┌─────────────────────────────────────────────────────────────────────────────┐
│ Assigning, by the server, a respective group of mobile message recipients to the first template of │
│              the mobile message and the second template of the mobile message                     │
│                                            820                                                    │
└─────────────────────────────────────────────────────────────────────────────┘
                                             │
                                             ▼
┌─────────────────────────────────────────────────────────────────────────────┐
│ Determining automatically, by the server, whether the first template of the mobile message has a   │
│        statistical advantage over the second template of the mobile message through testing        │
│                                            830                                                    │
└─────────────────────────────────────────────────────────────────────────────┘
                                             │
                                             ▼
┌─────────────────────────────────────────────────────────────────────────────┐
│ Collecting test data from testing including mobile message recipient actions of the first template │
│                  of the mobile message and the second template of the mobile message              │
│                                            840                                                    │
└─────────────────────────────────────────────────────────────────────────────┘
                                             │
                                             ▼
┌─────────────────────────────────────────────────────────────────────────────┐
│ Generating estimates of a success rates for the first template and the second template including   │
│ applying an analysis method to the collected test data to determine a win probability difference   │
│ between a win probability for the first template and a win probability for the second template,    │
│   and determine that the win probability difference is greater than a selected win threshold       │
│                                            850                                                    │
└─────────────────────────────────────────────────────────────────────────────┘
                                             │
                                             ▼
┌─────────────────────────────────────────────────────────────────────────────┐
│   Determining that a precision of the estimates of the success rate is greater than a precision    │
│                                         threshold                                                  │
│                                            860                                                    │
└─────────────────────────────────────────────────────────────────────────────┘
                                             │
                                             ▼
┌─────────────────────────────────────────────────────────────────────────────┐
│         Determining that greater than a volume threshold of test data has been collected           │
│                                            870                                                    │
└─────────────────────────────────────────────────────────────────────────────┘
```

*FIG. 8*

AUTOMATED TESTING OF TEMPLATES OF A MOBILE MESSAGE

RELATED PATENT APPLICATIONS

This patent application claims priority to Provisional Patent Application Ser. No. 63/344,591, filed May 22, 2022, which is herein incorporated by reference.

FIELD OF THE DESCRIBED EMBODIMENTS

The described embodiments relate generally to intelligent electronic commerce. More particularly, the described embodiments relate to systems, methods and apparatuses for automated testing and selection of multiple templates of a mobile message.

BACKGROUND

Templates can be used for defining a mobile message which can be provided to a mobile message recipient. Different mobile messages can have different levels of success when provided to the mobile message recipient (customer).

It is desirable to have methods, apparatuses, and systems for automated testing and selection of multiple templates of a mobile message.

SUMMARY

An embodiment includes a computer-implemented method of automated testing of templates of a mobile message. The method includes generating, by a server, at least a first template of the mobile message and a second template of the mobile message, each of the first template and the second template having at least a different content or a different send time, assigning, by the server, a respective group of mobile message recipients to the first template of the mobile message and the second template of the mobile message, determining automatically, by the server, whether the first template of the mobile message has a statistical advantage over the second template of the mobile message through testing, comprising collecting test data from testing including mobile message recipient actions of the first template of the mobile message and the second template of the mobile message, generating estimates of a mobile message recipient actions for the first template and the second template including applying an analysis method to the collected test data to determine a win probability difference between a win probability for the first template and a win probability for the second template, and determine that the win probability difference is greater than a selected win threshold, determining that a precision of the estimates of the success rate is greater than a precision threshold, and sending the mobile message of the first template to the remainder of the planned mobile message recipients when the first template of the mobile message is determined to have the statistical advantage over the second template of the mobile message.

Another embodiment includes a system for automated testing and selection of multiple templates of a mobile message. The system includes a marketing manager sever configured to operate and manage a website, a plurality of mobile devices configured to receive mobile messages, and a server electronically connected to the marketing manager sever and the plurality of mobile devices. The server is configured to generate at least a first template of the mobile message and a second template of the mobile message, each of the first template and the second template having at least a different content or a different send time. Further, the server is configured to assign a respective group of mobile message recipients of planned mobile message recipients to the first template of the mobile message and to the second template of the mobile message, determine automatically whether the first template of the mobile message has a statistical advantage over the second template of the mobile message through testing, comprising the server operating to collect test data from testing including mobile message recipient actions of the first template of the mobile message and the second template of the mobile message, generate estimates of mobile message recipient actions for the first template and the second template including applying an analysis method to the collected test data to determine a win probability difference between a win probability for the first template and a win probability for the second template, and determine that the win probability difference is greater than a selected win threshold, determine that a precision of the estimates of the success rate is greater than a precision threshold, and send the mobile message of the first template to a remainder of the planned mobile message recipients when the first template of the mobile message is determined to have the statistical advantage over the second template of the mobile message.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a flow chart that includes steps of a method of determining a precision estimate of a success rate of a template, according to an embodiment.

FIG. 8 is a flow chart of steps of a method of automated testing and selection of multiple templates of a mobile message, according to an embodiment.

DETAILED DESCRIPTION

The embodiments described include methods, apparatuses, and systems for automated testing and selection of multiple templates of a mobile message.

Figure 1:
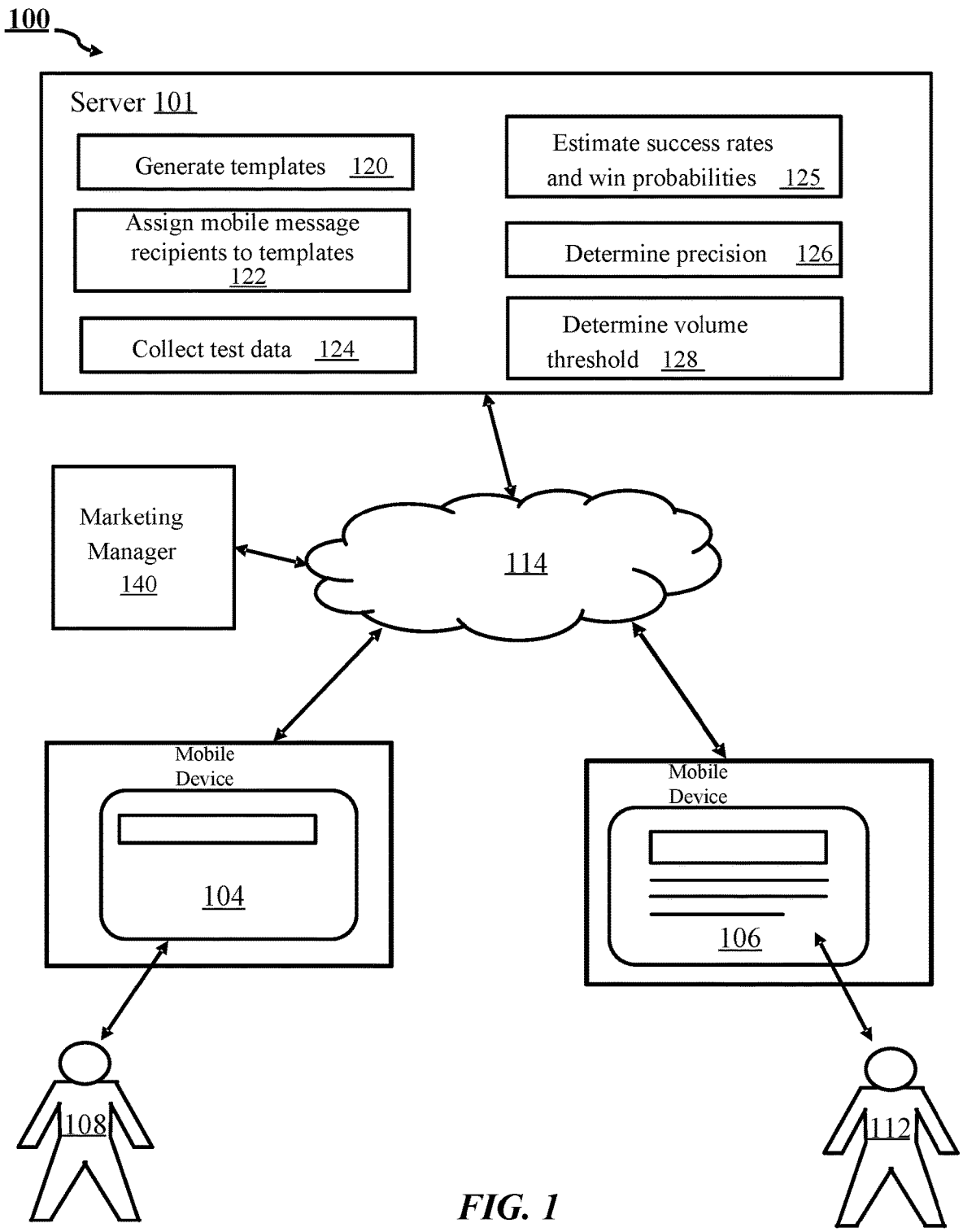
FIG. 1 shows a system for automated testing and selection of a template of a mobile message, according to an embodiment.

FIG. 1 shows a system 100 for automated testing and selection of a template of a mobile message, according to an embodiment. The system 100 includes a server 101. For an embodiment, the server 101 is electronically connected through a network 114 to electronic mobile devices 104, 106 of mobile message recipients 108, 112. For an embodiment, the server 101 operates to generate 120 at least a first template of the mobile message and a second template of the mobile message each having different content or different send times. For at least some embodiments, the first template and the second template further include different displays. That is, mobile messages associated with the first template and the second template display mobile messages in varying ways. Though described here as the generation of a first template and a second template, it is to be understood that the server 101 operates to generate N templates that include the first template and a second template.

A marketing manager (server) 140 operates and manages an ecommerce website. For an embodiment, the marketing manager 140 includes a server of a business that operates to directly control the ecommerce website. For an embodiment, the marketing manager 140 includes a combination of the business and a third party to operate to control the ecommerce website. For an embodiment, the marketing manager 140 is a customer of the operator of the server 101. For an embodiment, the marketing manager 140 is a combination of the customer of the operator of the server 101 and a third party (such as, a Shopify platform).

For an embodiment, each of the N templates includes a set of data objects that combine to represent a structure of a mobile message. As described, the first and second templates of the N templates of the mobile message each have a different content, a different send time, and/or a different behavior. The different displays of the mobile message can include a changing display, such as, movement or varying display intensity. Accordingly, the set of data objects of each of the first and second templates combine to represent a structure of mobile message having a different content, different send times, or different behavior of the mobile messages. For an embodiment, the structure of the mobile message includes the content, the send time, or the behavior control. For an embodiment, the templates additional include information pertaining to testing of the mobile message(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

For an embodiment, the server 101 operates to assign 122 a respective group of mobile message recipients planned mobile message recipients to the first template of the mobile message and the second template of the mobile message. For an embodiment, the planned mobile message recipients are mobile message recipients that are available for testing, and available for receiving mobile messages after the testing has been completed. That is, for an embodiment, a subset of the planned mobile message recipients is selected for receiving mobile messages according to multiple templates for testing. Once the testing has been completed, a winning template can be used for a least a portion of the remaining planned mobile message recipients that were not included within the testing. For an embodiment, the assigning is random. For an embodiment, the mobile message recipients are obtained by tracking information of mobile message recipients to the customer website managed by the marketing manager 140.

For an embodiment, the mobile message recipients include recent mobile message recipients. For an embodiment, recent mobile message recipients include site mobile message recipients that have visited the customer website within a predetermined time-period. For an embodiment, mobile message recipients include a selected number of most recent customer website visitors. For an embodiment, recent site visitors include mobile message recipients since a specific event. For an embodiment, the specific event may include, for example, a large change in the settings of a template test. For an embodiment, the assigning is random with equal probabilistic distributions within each geographical region that the test is sent to. For example, the mobile message may be sent to mobile message recipients from N different geographical regions. For an embodiment, an equal number (or near equal) of mobile messages is sent to each of the geographical regions, but randomly sent to the mobile message recipients within each of the regions. For an embodiment, the assigning is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

For an embodiment, the server 101 further operates to determine automatically whether the first template of the mobile message is statistically more advantageous than the second template of the mobile message. For an embodiment, the server 101 operating to determine the statistical advantage includes collecting 124 test data from testing including qualification for recipient actions, and successes of the first template of the mobile message and the second template of the mobile message. Generally, a mobile message with a statistical advantage is better at soliciting a desired response from a mobile message recipient that receives the mobile message.

Qualification for Sending

For at least some embodiments, an eligibility of the mobile message recipient is determined dynamically by a combination of a geolocation of the mobile message recipient, transactional (for example, purchase confirmation, delivery confirmation) vs. marketing purpose of the mobile message, and recency of the last marketing mobile or email message received. For example, only mobile message recipients who have not received a marketing email and/or marketing mobile message within the past 24 hours (or some other predetermined or adaptive time period X) are eligible to receive this message. For an embodiment, the planned mobile message recipients are determined when a mobile message is scheduled for transmission to the mobile message recipients. For an embodiment, when the mobile message is sent, the time that each planned mobile message recipient received their most recent marketing mobile message is determined, and only those mobile message recipients that have not received a marketing mobile message in the past X hours are deemed eligible mobile message recipients.

Successes

For an embodiment, successes include the mobile message recipient(s) carrying out a main action that a mobile message is intended to elicit, such as, for example, clicking a link in the mobile message (potentially embedded in an image), or making a purchase on the website linked to in the mobile message. Further, the mobile message recipients receive the mobile messages via mobile device, such as, a cellular phone. Accordingly, physical actions of the mobile message recipients can be tracked to determine whether the mobile message recipient(s) carried out a main action that a mobile message is intended to elicit. That is, sensors, such as, location sensors, such as, GPS (global positioning system) sensors, and/or motion sensors (such as, accelerometers, gyroscopes, and/or magnetic sensors) can be used to track the locations and actions of the mobile message recipient(s) to determine whether the mobile message recipient(s) performed the main action or another action. Sensed action can include, for example, sensing that the mobile message recipient(s) deviated in behavior (sensed motion) or location. The sensed behavior or sensed location can be used, for example, to determine that the mobile message recipient(s) visited a physical location of the merchant of the marketing manager server 140. Further, actions of the mobile message recipient(s) can be sensed by detecting motions of the mobile message recipient(s) that indicated that the mobile message recipient(s) perused the physical location of the merchant and picked up and physically looked at a product. Further, actions of multiple mobile message recipient(s) can be sensed to determine that different mobile message recipient(s) interacted and caused behavior changes between the mobile message recipient(s) and potentially others. The sensed location and actions of mobile recipients can be used to establish relationships between different recipients. Once relationships are established, interactions between different of the related mobile recipients can be sensed and determined to be caused by reception of a mobile message. Such interactions can be determined to be a main action that a mobile message is intended to elicit.

For at least some embodiments, the server 101 further operates to generate estimates 125 of success rates for the first template and the second template including applying an analysis method to the collected test data to determine a win probability difference between a win probability for the first template and a win probability for the second template and determining that the win probability difference is greater than a selected win threshold.

For at least some embodiments, the server 101 further operates to determine that a precision 126 of the estimates of the success rate is greater than a precision threshold, and determines that greater than a volume threshold 128 of test data has been collected.

For an embodiment, the statistical advantage is declared for the first template when the selected win threshold, the precision threshold, and the volume threshold are all met. That is, the first template is determined to perform statistically better than the second template when the selected win threshold, the precision threshold, and the volume threshold are all met. The decision may be made by the marketing manager to favor the first template over the second template based on the statistical advantage demonstrated by the first template over the second template. For an embodiment, the server 101 automatically operates to favor the first template over the second template based on the statistical advantage demonstrated by the first template over the second template.

For at least some embodiments, the selected win threshold, the precision threshold, and the volume threshold are all preselected. For an embodiment, at least one of the selected win threshold, the precision threshold, and the volume threshold are preselected, and at least one other of the selected win threshold, the precision threshold, and the volume threshold is adaptively adjusted. For an embodiment, the selected win threshold, the precision threshold, and the volume threshold are all adaptively adjusted.

Selected Win Threshold

For an embodiment, the selected win threshold is preselected based on best practices established over time. For an embodiment, the selected win threshold is adaptively selected based on input or feedback from the mobile message recipients (customers of the marketing manager). For an embodiment, the selected thresholds are determined through prior simulation. For an embodiment, the selected win threshold is changed over time based on at least one of a plurality of factors. The factors can include preferences of the website operator (that is, directly selecting a threshold (if the website operator has a level of statistical knowledge) or the website operator choosing how "aggressive" they want to be to find a winner early or how "sure" they want to be in an outcome], a detected anomaly (that is, for example, an error in data collection), or pattern in collected data (that is, a very spiky (variations of greater than a threshold amount) visit volume pattern on a website that makes the website operator want to regularize to avoid extreme spikes having an effect that is too large). For an embodiment, the selected win threshold is adaptively adjusted based on one or more of these listed factors.

Precision Threshold

For an embodiment, the precision threshold is preselected based on predicted or simulated false positive and false negative rates based on a number of received messages and successes that are realistic, wherein realistic successes is based on historical data for a marketing mobile message sent to mobile message recipients of the customer). For an embodiment, the precision threshold is adaptively selected based on data from data of a particular website, or the data of websites that are similar (for example, a website that has similar observed patterns in business metrics and/or that sells similar products or is in a similar industry vertical, and/or a website with a similar behavior (for example, frequency, size of messages, type of messages (e.g. transactional vs. marketing)) in sending mobile messages.

Volume Threshold

For an embodiment, the volume threshold is preselected based on predicted or simulated false positive and false negative rates based on a number of message recipients and successes that are realistic, wherein realistic successes is based on historical data for a mobile message of the mobile message recipient. For an embodiment, the volume threshold is adaptively selected based on data from data of a particular website, or the data of websites that are similar (for example, a website with a similar amount of mobile message recipients). For an embodiment, the volume threshold is adaptively selected based on data from data of a particular website, or the data of websites that are similar (for example, a website that has similar observed patterns in business metrics and/or that sells similar products or is in a similar industry vertical a website with a similar amount of or pattern in site visitor traffic.

For an embodiment, the generating of the estimates, checking the precision, and checking the volume threshold, appear to be performed simultaneously in real-time. That is, the operations are performed so that the performance appears simultaneous to a website manager and a mobile message recipient.

As previously described, for an embodiment, the server 101 further operates to generate estimates 125 of success rates for the first template and the second template including applying an analysis method to the collected test data to determine a win probability difference between a win probability for the first template and a win probability for the second template and determine that the win probability difference is greater than a selected win threshold. For an embodiment, the analysis method includes generating a win probability, wherein the win probability represents a probability that a template variation currently leading the testing has a higher success rate than other variations after accounting for random chance. Example analysis methods include a Bayesian posterior probability or a frequentist p-value. For an embodiment, the random chance is accounted for by using at least one of these two methods.

At least some embodiments further include determining that a conversion rate is similar with conversion rates of marketing mobile messages, as opposed to transactional mobile messages or other types of marketing messages. However, for an embodiment, the applied analysis method is optimized for conversion rates similar with conversion rates of those seen in mobile messages. For example, for a Bayesian prior that is constructed using historical mobile message data. For an embodiment, this is specific to the expected data setting for an individual mobile message, using factors such as success rates on mobile messages with similar behavior, send time, and content, success rates on for mobile messages from the same site or similar sites.

Figure 2:
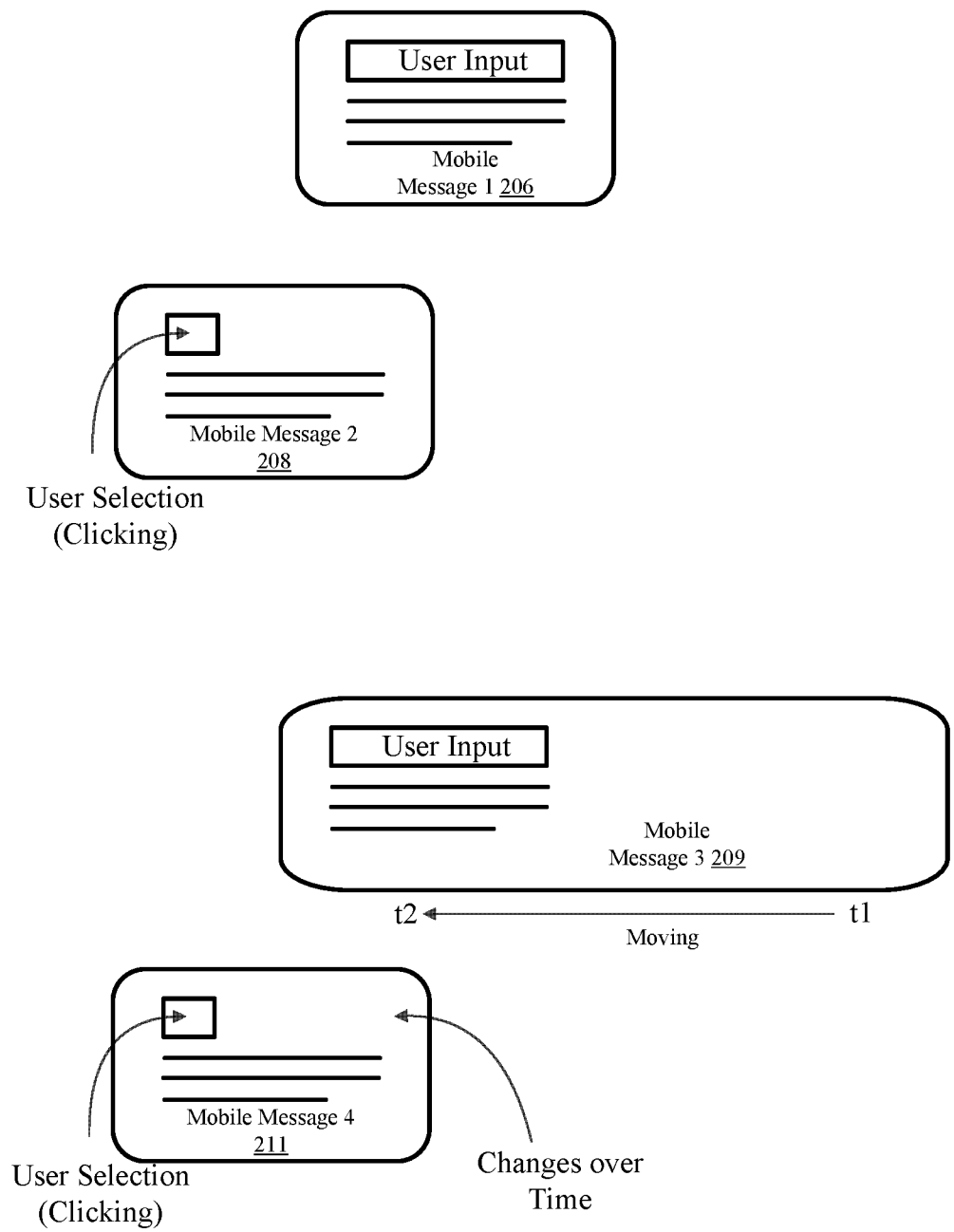
FIG. 2 shows mobile messages that require an input, according to an embodiment.

FIG. 2 shows mobile messages that require an input, according to an embodiment. A first display of a mobile device of a mobile message recipient includes a mobile message 206 that requires an input from a user (mobile message recipient) and a mobile message 208 that requires a user input through, for example, a selection, such as, through a click. A second display includes a mobile message 209 that changes on the display between times t1 and t2, and a mobile message 211 that is delivered a time t3 after the mobile message has been sent. Clearly, other mobile messages having different content, send times, and behavior can be utilized.

For an embodiment, the mobile message includes a file configured to receive an input from a mobile message recipient. For an embodiment, the required input includes at least one or more of the customers (site visitor) clicking to a different page, or the customer entering information. However, as previously mentioned, sensors of mobile devices of the mobile message recipients can be utilized to determine or detect actions of the mobile message recipients that indicated changes in behavior of the mobile message recipient due to receiving the mobile messages of the different templates.

Figure 3:
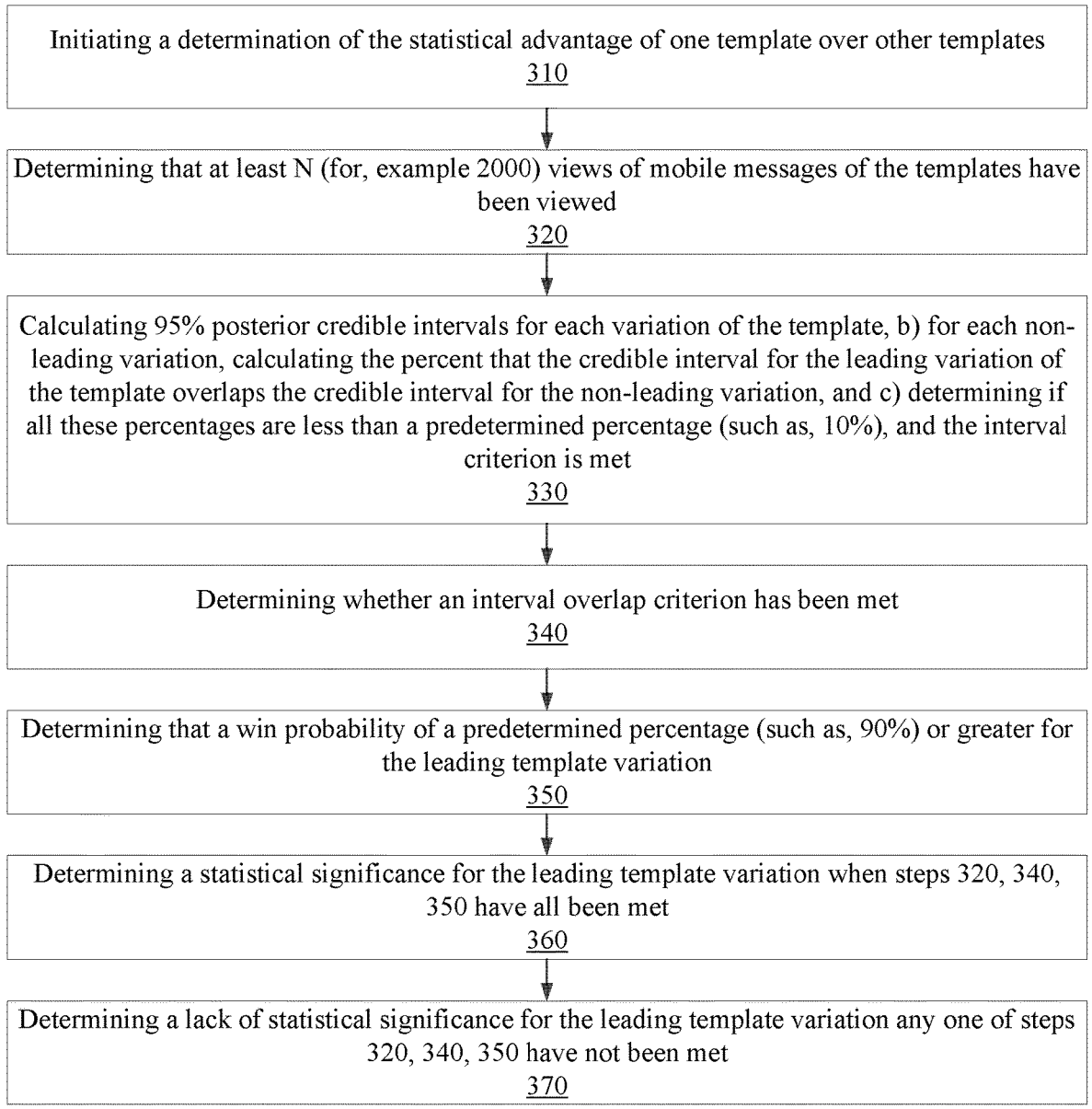
FIG. 3 is a flow chart that includes steps of a method for determining a statistical advantage of one template over another template, according to another embodiment.

FIG. 3 is a flow chart that includes steps of a method for determining a statistical advantage of one template over another template, according to another embodiment.

As previously described, for an embodiment, the statistical advantage is declared for the first template when the selected win threshold, the precision threshold, and the volume threshold are all met. A first step 310 of the flow chart of FIG. 3 includes initiating a determination of the statistical advantage of one template over other templates. A second step 320 includes determining that at least N (for example, 2000) mobile messages of the templates have been received. The second step 320 can be equated with the previously described volume threshold determination.

A third step 330 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 330 is a necessary step to compute the precision threshold.

A fourth step 340 includes determining whether an interval overlap criterion has been met. For an embodiment, the interval overlap criterion is true (met) if the percent overlap calculated in step 330 is less than a pre-selected precision threshold.

A fifth step 350 includes determining a win probability of a predetermined percentage (such as, 90%) or greater for the leading template variation. That is, the win probability threshold is satisfied.

A sixth step 360 includes determining a statistical significance for the leading template variation when steps 320, 340, 350 have all been met.

A seventh step 370 includes determining a lack of statistical significance for the leading template variation any one of steps 320, 340, 350 have not been met.

FIG. 4 is a flow chart that includes steps of a method of determining a precision estimate of a success rate of a template, according to an embodiment.

As previously described, at least some embodiments include checking that the precision of the estimates of the success rate is greater than a precision threshold. For an embodiment, checking that the precision of the estimates of the success rate is greater than a precision threshold includes 410 determining the range of values that the N success rates of N different templates could take given a pre-defined level of random chance, For an embodiment, this includes 420 comparing a fraction of credible intervals that are overlapping, wherein credible intervals include a range of values that the success rate is likely to fall within after accounting for random chance. and 430 checking that these ranges of values indicate a sufficiently higher success rate for the leading variation after accounting for random chance. That is, step 430 includes determining whether the overlap fraction is small (below a certain threshold)

Figure 5:
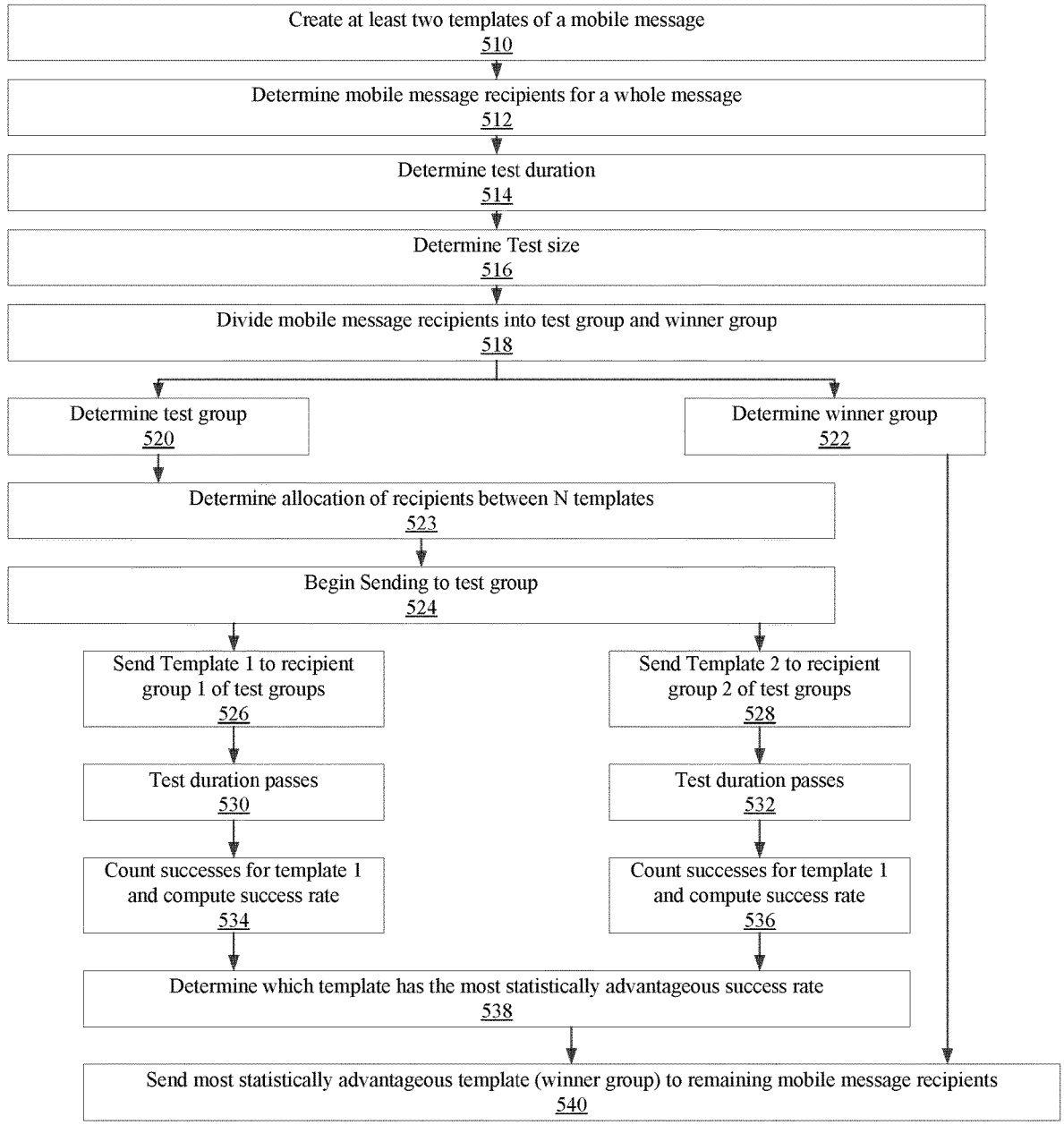
FIG. 5 is a flow chart that includes steps of a method for assigning a respective group of mobile message recipients to a first template of a mobile message and a second template of the mobile message, according to an embodiment.

FIG. 5 is a flow chart that includes steps of a method for assigning a respective group of mobile message recipients to a first template of a mobile message and a second template of the mobile message, according to an embodiment.

A step 510 includes creating at least two templates of a mobile message. As previously described, multiple templates are created, wherein each of the templates include a set of data objects that combine to represent a structure of a mobile message. As described, the first and second templates of N templates of the mobile message each have a different content, a different send time, or a different behavior. Accordingly, the set of data objects of each of the first and second templates combine to represent a structure of mobile message having a different content, send times, and/or different behaviors. For an embodiment, the structure of the mobile message includes the content, the send time, and/or the mobile message behavior. For an embodiment, the templates additional include information pertaining to testing of the mobile message(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

A step 512 includes determining mobile message recipients for a whole message. That is, the list of all planned mobile message recipients is determined.

A step 514 includes determining a test duration. For an embodiment, the test duration is determined based on one or more of an intended send time of the mobile messages, legal restrictions on send times of mobile messages, a rate of change of data over time in similar tests, and/or a test size.

A step 516 includes determining a test size. For an embodiment, the test size is determined based on at least one of the intended send time of the mobile messages, the test duration of the mobile messages, the rate of change of data over time for similarly sized tests, the success rate of similar mobile messages, the content, behavior, and/or send times of the templates of the mobile messages included in the testing of the templates.

A step 518 includes dividing the mobile message recipients into a test group 520 and a winner group 522. For an embodiment, the planned mobile message recipients include all of the mobile message recipient that the mobile messages. For an embodiment, the test group and the winner group are a mutually exclusive groups of mobile message recipients. Further, for an embodiment, the test group and the winner group are an exhaustive (that is, account for the entire group of planned mobile message recipients between the two) division of the planned mobile message recipients. For an embodiment, the test group are selected for testing and determining the winning template. For an embodiment, the winner group of mobile message recipients then receive mobile messages according to the winning template as determined by the testing of the multiple templates.

A step 523 includes determining the allocation of recipients between N templates (wherein the N templates includes at least the first and second templates). For an embodiment, the allocating is random. For an embodiment, the allocating is random with equal probabilistic distributions within each geographical region that the test is sent to. For example, the mobile message may be sent to mobile message recipients from N different geographical regions. For an embodiment, an equal number of mobile messages is sent to each of the geographical regions, but randomly sent to the mobile message recipients within each of the regions. As previously described, for an embodiment, the assigning is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

A step 524 includes sending the message according to the N templates to the test group.

Steps 526, 528 include sending the mobile message according to a template 1 and a template 2 of the N templates to a group 1 of the test group and a group 2 of the test group.

Steps 530, 532 include waiting for the determined test duration to pass. During the determined test duration actions of the mobile message recipients are tracked and monitored.

Steps 534, 536 include counting the successes of the mobile message sent to mobile message recipients of the group 1 and group 2 according to the template 1 and the template 2. As previously described, for an embodiment, successes of the mobile messages generally include determining how many of the mobile message recipients of the mobile messages are tracked or determined to have performed a task of the mobile message. For an embodiment, the tracked and monitored activities of the mobile message recipients are online activities. For an embodiment, mobile devices of the mobile message recipients are tracked, and the tracked and monitored activities include locations and motions of the mobile message recipients.

A step 538 includes using the previously described embodiments for determining which of the templates has the statistically advantageous success rate. The template that has the statistically advantageous success rate can be designated as the winner or winning template.

A step 540 includes sending the mobile message using the statistically advantageous success rate (winner) template to the winner group.

Figure 6:
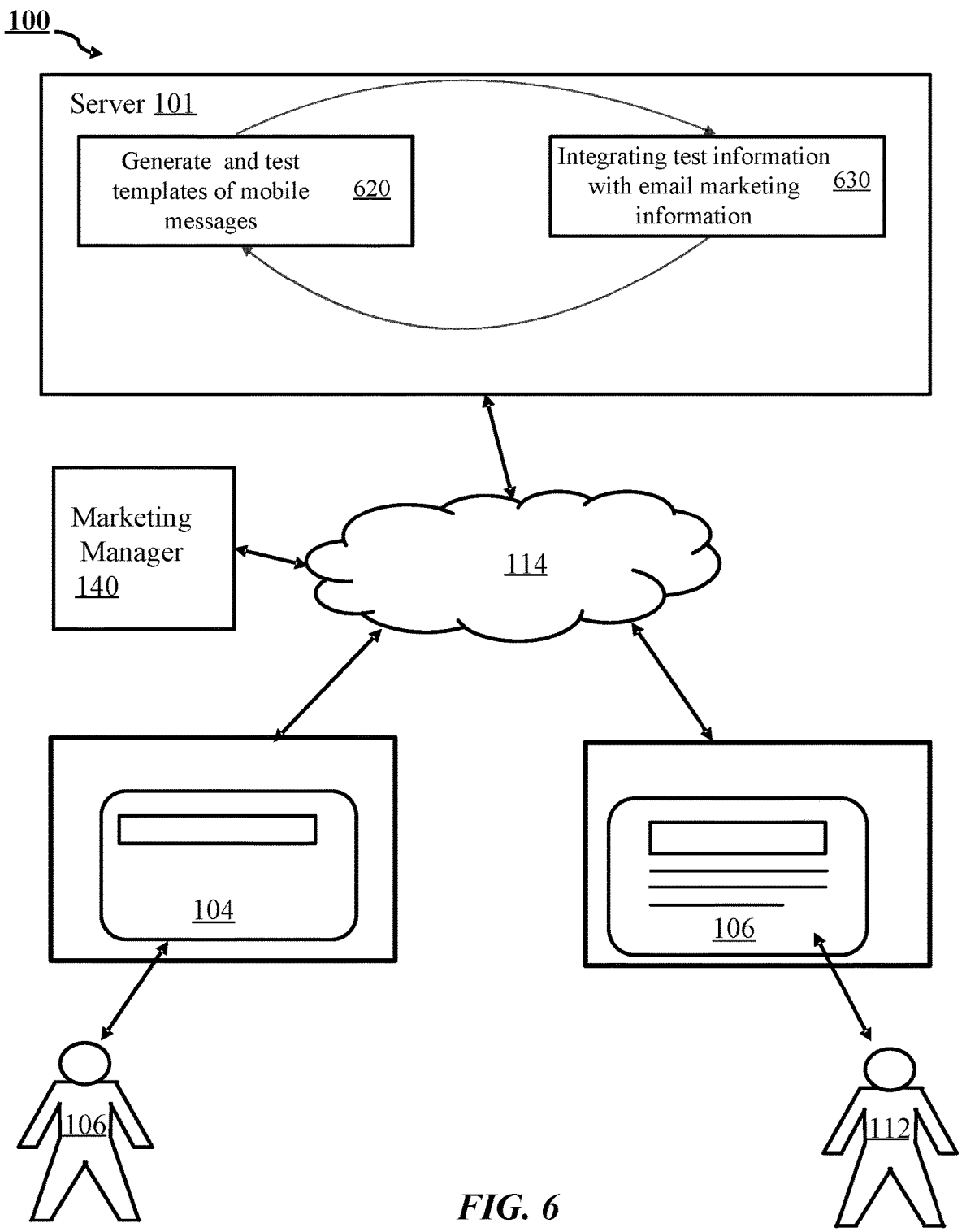
FIG. 6 shows a system that further includes integrating information received from the testing with electronic marketing information, according to an embodiment.

FIG. 6 shows a system that further includes integrating information received from the testing with electronic marketing information, according to an embodiment.

For an embodiment, integrating the electronic marketing information includes using electronic marketing information to qualify the mobile message recipients. That is, for an embodiment, the electronic marketing information is used to target particular mobile message recipients. For example, for an embodiment, templates are targeted to mobile message recipients that have taken certain actions which have been tracked. That is, the templates in a particular test are only sent to mobile message recipients who have clicked a specific email, specific mobile message, or online activity.

For an embodiment, content in the template(s) is dynamically updated based on actions or characteristics of the user. For example, different images or content of mobile messages of the templates are sent to the mobile message recipients based on the last product that a mobile message recipient browsed. Further, the mobile devices of the mobile message recipients can be tracked and monitored. For an embodiment, the content of the templates is additionally updated by physical location and activities of the mobile message recipients. The physical location and the activities can be sensed and/or identified based on locations and motion sensed by sensor of the mobile devices of the mobile message recipients.

For an embodiment, generating and testing the templates of the mobile messages 620 is integrated with email (including mobile messages) marketing information 630 of the mobile message recipients. For an embodiment, the marketing information influences the testing and selecting of the template of the mobile messages. For an embodiment, at least some of the test information determined during testing of the templates is used for influencing marketing information. For example, different coupons may be included with different tested templates to send mobile messages with different discounts.

For an embodiment, integrating electronic marketing information includes ensuring that participants (mobile message recipients) in the test have all taken actions pertaining to other marketing actions. For example, the actions taken can include opening or clicking an email or mobile message within the last X (such as, 7) days. For an embodiment, marketing information is used to qualify participants (mobile message recipients).

For an embodiment, integrating electronic marketing information includes ensuring that different discount offers are present in different templates in the test. For example, this can include a 10% off discount for some templates versus free shipping for other templates that are delivered to the correct test participants though automated mobile messages.

For an embodiment, integrating electronic marketing information includes counting the number of test participants who viewed one template in the test and carried out another action. For example, this can include counting the number of test participants that have purchased a product within the last next Y (for example 7) days.

Figure 7:
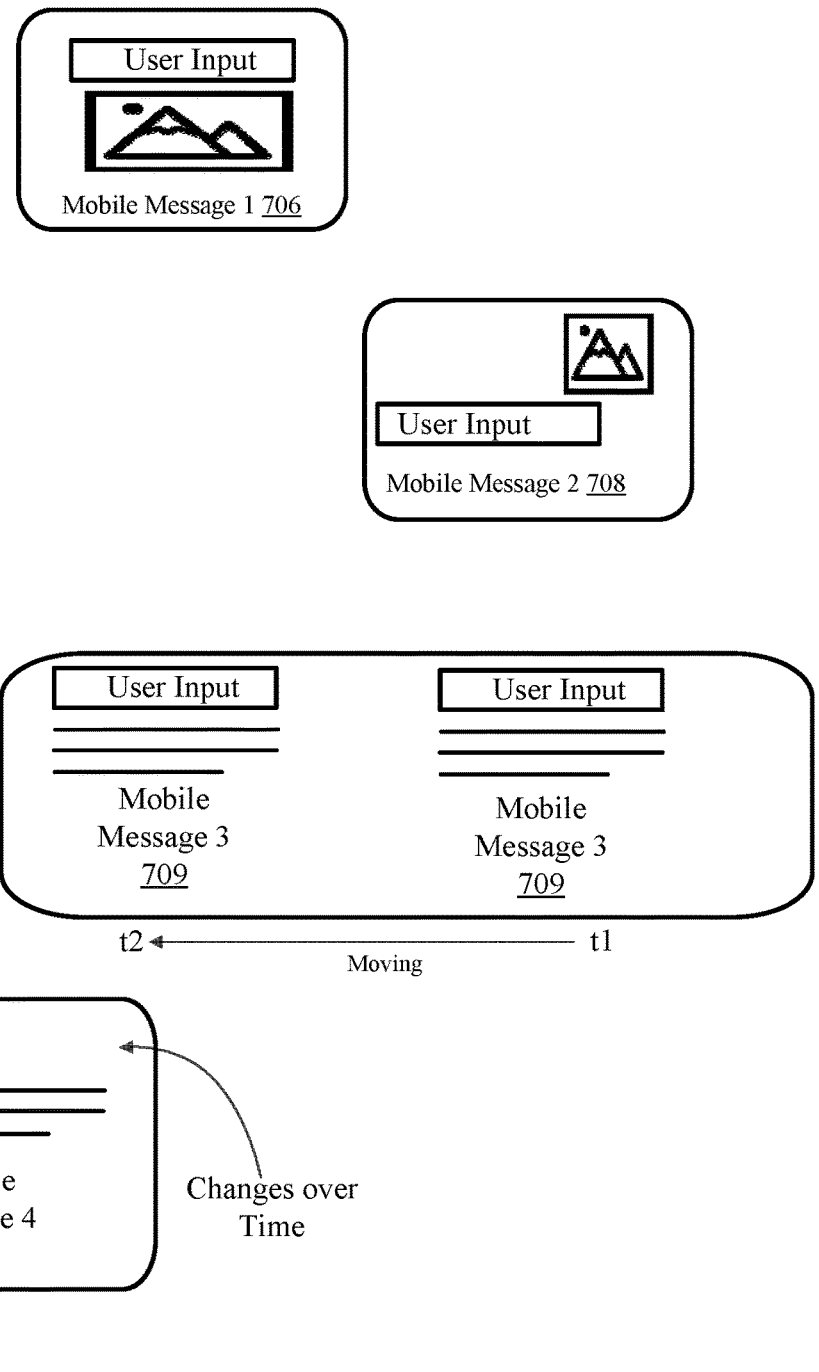
FIG. 7 shows templates of a mobile message each having different content or behavior, according to an embodiment.

FIG. 7 shows templates of a mobile message each having different content, send time, or behavior, according to an embodiment.

For an embodiment, the different content of the first template and the second template includes at least visual representations of the mobile message, including at least one of a text, a layout, a design, colors, or images contained in the mobile message. A first display of the website includes examples of mobile messages 706, 708 that have different layouts.

For an embodiment, templates that have different send times are sent to the mobile message recipients at different times. For an embodiment, a different send time of the first template and the second template include a first send time for the first template and a second send time of the second template. For an embodiment, messages received at different times during the day may be more or less likely to achieve success, based on trends observed in both mobile messages and email. That is mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, the different behavior of the first template and the second template includes presenting the mobile message in different ways to different mobile message recipients. For an embodiment, this includes presenting the mobile message in different colors. For an embodiment, this includes presenting the mobile messages to the mobile message for different amounts of time. For an embodiment, this includes presenting the mobile message with different intensities. For an embodiment, this includes mobile messages (such as, mobile messages 209, 211) have displays that change with time, for example, a moving emoji.

FIG. 8 is a flow chart of steps of a method of automated testing and selection of multiple templates of a mobile message, according to an embodiment. A first step 810 includes generating, by a server, at least a first template of the mobile message and a second template of the mobile message, each of the first template and the second template having at least a different content, a different send times, or different behavior. For an embodiment, the mobile message is configured to receive an input from a mobile message recipient.

As previously described, the first and second templates of N templates of the mobile message each have a different content, send time, and/or behavior. Accordingly, the set of data objects of each of the first and second templates combine to represent a structure of mobile messages having a different content, send times, and/or different behaviors. The structure of a mobile message includes the content, the send time, and/or the behavior. For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the templates are used to integrate the process of testing the mobile messages created by the templates into the practical application of controlling the content and behavior of the resulting mobile messages on a display of a website visitor. As shown in FIG. 7, the content of the mobile messages of the different templates of the mobile message recipients is different, or the send times of the mobile messages of the different templates of the mobile message is different. The different content, different send times, and/or behavior is integral and improves on testing of different mobile messages.

A second step 820 includes assigning, by the server, a respective group of mobile message recipients to the first template of the mobile message and the second template of the mobile message, wherein the assigning is random. A third step 830 includes determining automatically, by the server, whether the first template of the mobile message has a statistical advantage over the second template of the mobile message, which includes a fourth step 840 of collecting test data from testing including qualification for views, views, and successes of the first template of the mobile message and the second template of the mobile message, a fifth step 850 of generating estimates of a success rates for the first template and the second template including applying an analysis method to the collected test data to determine a win probability difference between a win probability for the first template and a win probability for the second template, and determine that the win probability difference is greater than a selected win threshold, a sixth step 860 of determining that a precision of the estimates of the success rate is greater than a precision threshold, and a seventh step 870 of determining that greater than a volume threshold of test data has been collected.

An embodiment includes sending the mobile message of the first template on the website when the first template of the mobile message is determined to have a statistical advantage over the second template of the mobile message. That is, for an embodiment, when the first template is determined to have a statistical advantage over the second template, the first template is identified as the winning template. For an embodiment, the winning template is sent to the remainder of the mobile message recipients with a 100% allocation. The selection of the winning template based on the success rates of the templates integrates the process of template selection into the practical application of sending the most efficient and effective mobile messages to the mobile message recipients, thereby providing improvements in the computing process of sending the mobile messages.

For an embodiment, the statistical advantage is declared for the first template when the selected win threshold, the precision threshold, and the volume threshold are all met. For an embodiment, the generating of the estimates, determining the precision, and determining the volume threshold, are performed simultaneously.

For an embodiment, the analysis method includes generating a win probability, wherein the win probability represents a probability that a template variation currently leading the testing has a higher success rate than other variations after accounting for random chance. An embodiment includes determining that a conversion rate is similar with conversion rates of marketing mobile messages, as opposed to transactional mobile messages or other types of marketing messages. However, for an embodiment, the applied analysis method is optimized for conversion rates similar with conversion rates of those seen in mobile messages. For example, for a Bayesian prior that is constructed using historical mobile message data. For an embodiment, this is specific to the expected data setting for an individual mobile message, using factors such as success rates on mobile messages with similar behavior, send time, and content, success rates on for mobile messages from the same site or similar sites.

For an embodiment, determining that the precision of the estimates of the success rate is greater than a precision threshold includes comparing a fraction of credible intervals that are overlapping, wherein credible intervals include a range of values that the success rate is likely to fall within after accounting for random chance. As previously described, a third step 330 of FIG. 3 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 330 is a necessary step to compute the precision threshold.

For an embodiment, assigning a respective group of the mobile message recipients to the first template of the mobile message and the second template of the mobile message, wherein the assigning is random, includes applying an adaptive method to set an allocation of mobile message recipients to templates that are performing better, randomly assigning the mobile message recipient to the first template and the second template based on the allocation, and sending the first template or the second template to the mobile message recipients as randomly assigned. For an embodiment, the assigning is random with equal probabilistic distributions within each geographical region that the test is sent to. For example, the mobile message may be sent to mobile message recipients from N different geographical regions. For an embodiment, an equal number of mobile messages is sent to each of the geographical regions, but randomly sent to the mobile message recipients within each of the regions.

For at least some embodiments, the assignment of each of the mobile message recipients is included within information attached to a profile of the mobile message recipient, wherein the information allows actions by the mobile message recipient to be tracked.

At least some embodiments further include integrating information received from the testing with electronic marketing information. For an embodiment, the electronic marketing information includes one or more of site visitor actions, discount offers, and product purchases. For an embodiment, integrating information received from the testing with electronic marketing information comprises using electronic marketing information to qualify the mobile message recipients for the testing includes ensuring that mobile message recipients in the testing have all taken actions pertaining to other marketing actions. For an embodiment, integrating information received from the testing with electronic marketing information comprises dynamically updating content in the templates based on actions or characteristics of the user within the electronic marketing information. For an embodiment, integrating information received from the testing with electronic marketing information includes at least some of the test information determined during testing of the templates being used for influencing marketing information.

As previously described and shown in FIGS. 2 and 7, for an embodiment, the different content of the first template and the second template includes at least visual representations of the form, including at least one of a size, a text, a layout, a design, colors, or images of the form. For an embodiment, the different content includes images that may increase or decrease likelihood of success due to being more or less engaging. For an embodiment, the different content includes different ways of wording an offer that can change success rates even if the offer itself is not changed. For an embodiment, the different content includes different emojis and different audiences react differently to the different emojis.

For an embodiment, a different send time of the first template and the second template include a first send time for the first template and a second send time of the second template. For an embodiment, messages received at different times during the day may be more or less likely to achieve success, based on trends observed in both mobile messages and email. That is mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, each of the first template and the second template further include different behavior, wherein the different behavior includes at least one of changes of the mobile messages over time, movement of the mobile messages, or changing color or intensity of the mobile messages. Further, for an embodiment, the different behavior of the first template and the second template includes at least a changing display (such as, changing content, changing color, and/or moving content) on the mobile device of the mobile message recipient.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the mobile message recipient actions of the first template of the mobile message and the second template of the mobile message.

Figure 9:
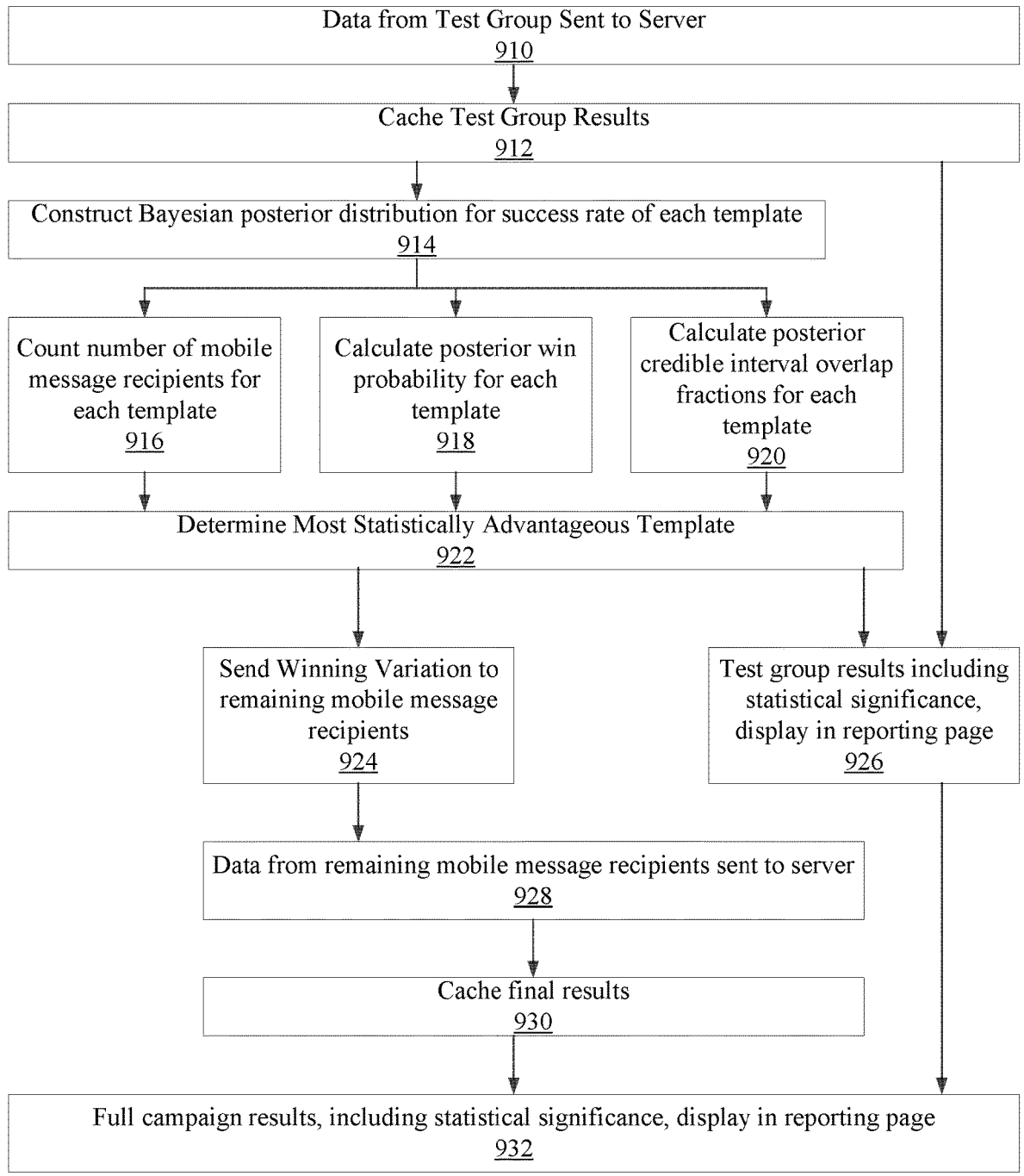
FIG. 9 is a flow chart that includes steps of a method of testing variations of templates, according to an embodiment.

FIG. 9 is a flow chart that includes steps of a method of testing variations of templates, according to an embodiment. A step 910 includes sending data from the test group to, for example, server 101. For an embodiment, the includes test data, which includes at least one of the mobile message recipients included in the test per template, the number of mobile messages sent per template, the number of clicks and/or successes observed per template, the time at which each mobile message was sent or click/success was observed, and/or any data gathered in the course of sending the message (e.g. updates to subscription settings).

A step 912 includes caching the test group results. For an embodiment, this includes storing the data obtained in step 910, which represents the test data at a point in time when the test ended. The data may further include test settings not gathered in step 910, such as the test duration, test size, and content of the templates.

A step 914 includes constructing a Bayesian posterior distribution for the success rate of each of the templates. The Bayesian posterior distribution has been previously described, but for an embodiment, the Bayesian posterior distribution represents a best estimate of the success rate of each template, while taking test data, prior information from similar tests, and statistical uncertainty into account.

A step 916 includes counting a number of mobile message recipients for each template. For an embodiment, this includes the number of planned mobile message recipients that were sent a message and that actually received the mobile message (that is, the mobile message did not fail to send).

A step 918 calculating a posterior win probability for each of the template. A step 920 includes calculating a posterior credible interval overlap fractions for each of the templates. The posterior credible interval overlap fractions have been previously described, but for an embodiment, the posterior credible interval overlap fractions represents the extent to which the nominally highest success for any template is actually higher than the success rate for all other templates, after taking statistical uncertainty into account.

A step 922 includes determining the most statistically advantageous template based on the counted number of mobile message recipients, the posterior win probability, and the posterior credible interval overlap fractions for each of the templates.

A step 924 includes sending the mobile message according to the winning variation of the template to the remaining mobile message recipients. For an embodiment, the remaining mobile message recipients includes the planned mobile message recipients that were not included in the testing (that is, mobile message receipts that did not receive mobile messages according to the first template (template 1) or the second template (template 2).

A step 926 includes displaying the test group results including the statistical significance in a reporting page. For an embodiment, the reporting page is a page that the server 101 makes available to the marketing manager. For an embodiment, the reporting page shows test data as well as data from an entire period after the mobile message was sent, including the distribution of data over time, as well as information about the mobile message, such as the test settings, the content of the templates, which template was the winner of the test, and whether the winner of the test had a statistically significant advantage over all other templates.

A step 928 includes sending data from remaining mobile message recipients to the server. For an embodiment, as described, this allows the reporting page to show data from the entire period after the mobile message was sent, including after the testing is over.

A step 930 includes caching the final results.

A step 932 includes displaying full electronic campaign results including statistical significance in the reporting page.

Figure 10:
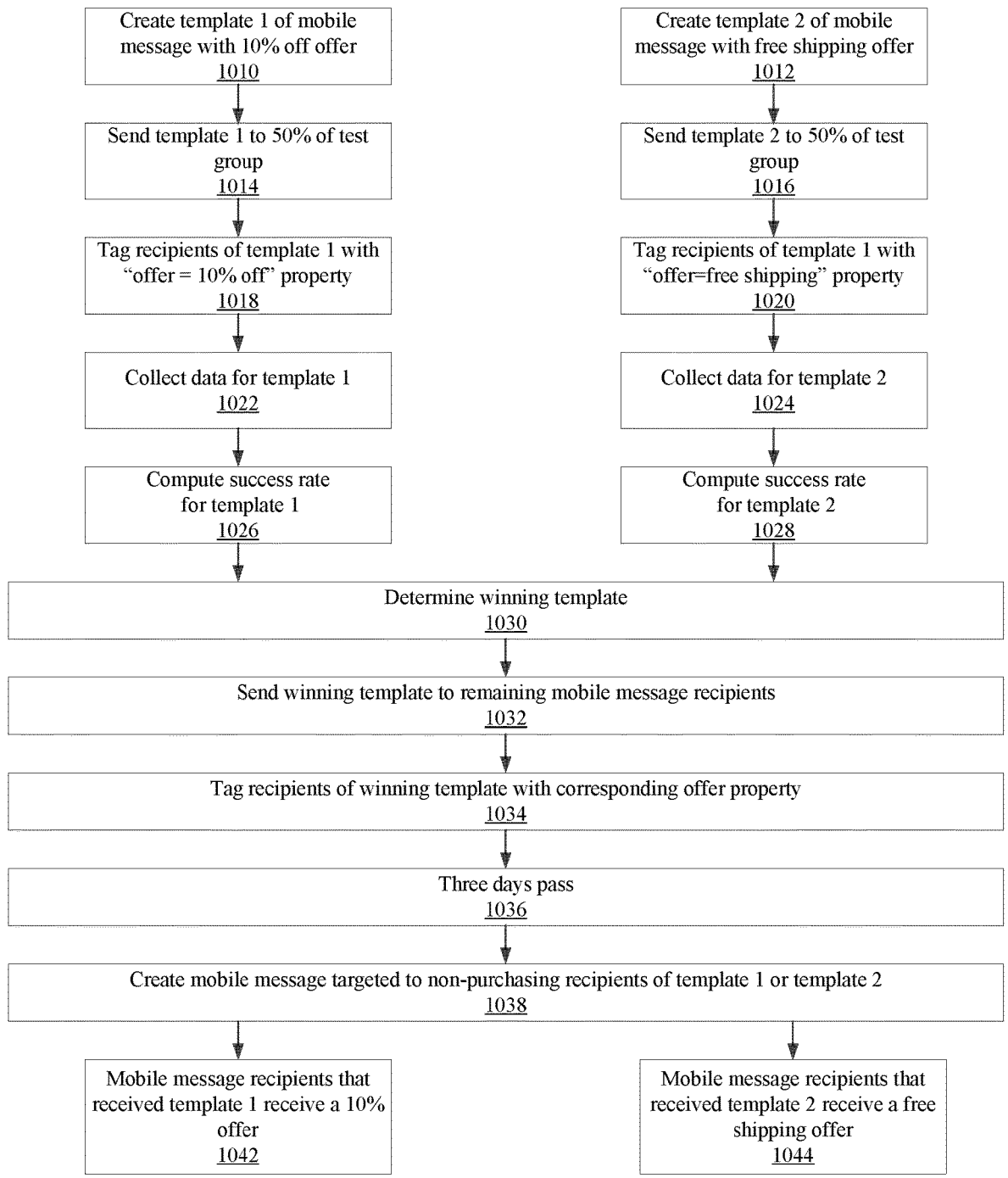
FIG. 10 is a flow chart that includes steps of a method of selecting content, send times, and behavior of templates and integrating the different content or behavior with marketing activities, according to an embodiment.

FIG. 10 is a flow chart that includes steps of a method of selecting content, send times, and behavior of templates and integrating the different content or behavior with marketing activities, according to an embodiment.

Steps 1010, 1012 include creating a template 1 of the mobile message that includes a 10% off offer and creating a template 2 that includes a free shipping offer. The two different templates generate mobile messages with different content. While the generated mobile messages according to the template 1 and the template 2 include different content, it is to be understood that the generated mobile messages could also include different send times or different behavior as well.

Steps 1014, 1016 include sending the mobile messages according to the template 1 and the template 2. According to step 1014, 50% of the test group are sent the mobile message according to the template 1, and according to step 1016, 50% of the test group are sent the mobile message according to the template 2. Other embodiments could include a different allocation between template 1 and template 2, either selected by the user or adaptively determined by the server based on the content, send times, or behavior of the templates.

Steps 1018, 1020 include tagging the recipients of the mobile message according to the template 1 with a "offer=10% off" property and tagging the recipients of the mobile message according to the template 2 with a "offer=free shipping" property. For an embodiment, tagging indicates that the mobile message recipient's profile reflects that the mobile message recipient has received an offer of the corresponding type.

Steps 1022, 1024 include collecting data of mobile recipient actions for mobile recipients that receive mobile messages according to the template 1 and collecting data of mobile recipient actions for mobile recipients that receive mobile messages according to the template 2.

Steps 1026, 1028 include determining success rate of the mobile message according to the template 1, and the success rate of the mobile message according to the template 2, based on the collected data of the mobile recipient actions.

Step 1030 includes determining the winning template based on the determined success rates.

Step 1032 includes sending mobile messages to the remaining mobile message recipients according to the determined winning template.

Step 1034 includes tagging the mobile messages according to the winning template that are sent to the mobile message recipients with the corresponding offer property.

Step 1036 includes tracking the mobile message recipient actions in response to receiving the mobile messages according to the winning template for a period of time, such as, three days.

Step 1038 includes creating additional mobile messages targeted to non-purchasing mobile message recipients of the mobile messages according to the template 1 or the template 2. For an embodiment, this includes the marketing manager creating alternate testing templates (template 1' and template 2') that contain the same offers as template 1 and template 2, respectively, but potentially different content, send times, or behaviors. For example, the alternate templates may include a statement like "You missed this deal". For an embodiment, the marketing manager creates a template 3, which has different content, send times, and/or behaviors than templates 1 and 2 but references the offer that the mobile message recipient received in either template 1 or 2.

Steps 1042, 1044 include providing mobile message recipients that receive the mobile message according to the template 1 with the 10% offer, and providing mobile message recipients the receive the mobile message according to the template 2 with the "free shipping" offer. For an embodiment, mobile message recipients who receive a mobile message according to template 1' will receive the same 10% off offer that they received in the mobile message according to template 1, and mobile message recipients who receive a mobile message according to template 2' will receive the same free shipping offer that they received in the mobile message according to template 2.

Although specific embodiments have been described and illustrated, the embodiments are not to be limited to the specific forms or arrangements of parts so described and illustrated. The described embodiments are to be only limited by the claims.

What is claimed:

1. A computer-implemented method for testing of a mobile message, comprising:
   generating, by a server, at least a first template of the mobile message and a second template of the mobile message, each of the first template and the second template having at least a different send time, wherein the first template has a first send time and the second template has a second send time, wherein the first and second send times are selected at least based on prior behavior of mobile message recipients;
   assigning, by the server, a respective group of mobile message recipients of planned mobile message recipients to the first template of the mobile message and to the second template of the mobile message, wherein each of the planned mobile message recipients are selected based on a combination of a geolocation of the planned mobile message recipient, a purpose of the mobile message, and a recency of a last marketing mobile message received by the planned mobile message recipient;
   determining automatically, by the server, whether the first template of the mobile message having the first send time has a statistical advantage over the second template of the mobile message having the second send time through testing, comprising:
      collecting test data from testing including mobile message recipient actions of the first template of the mobile message and the second template of the mobile message;
      generating estimates of mobile message recipient actions for the first template and the second template including applying an analysis method to the collected test data to determine a win probability difference between a win probability for the first template and a win probability for the second template, and determine that the win probability difference is greater than a selected win threshold;
      determining that a precision of the estimates of a success rate is greater than a precision threshold; and
   sending the mobile message of the first template to a remainder of the planned mobile message recipients when the first template of the mobile message is determined to have the statistical advantage over the second template of the mobile message,
   wherein determining that the precision of the estimates of the success rate is greater than a precision threshold comprises: comparing a fraction of credible intervals that are overlapping, wherein credible intervals include a range of values that the success rate is likely to fall within after accounting for random chance.

2. The computer-implemented method of claim 1, wherein the statistical advantage is declared for the first template when the selected win threshold and the precision threshold are both met after a preselected amount of time has passed.

3. The computer-implemented method of claim 2, wherein the generating of the estimates and determining the precision are performed simultaneously after the pre-selected amount of time has passed.

4. The computer-implemented method of claim 1, wherein the analysis method includes generating a win probability, wherein the win probability represents a probability that a template variation currently leading the testing has a higher mobile message recipient action than other variations after accounting for random chance.

5. The computer-implemented method of claim 4, further comprising determining that a conversion rate is similar to mobile message recipient actions of marketing mobile messages as opposed to other marketing messages sent.

6. The computer-implemented method of claim 1, wherein assigning a respective group of the mobile message recipients to the first template of the mobile message and the second template of the mobile message, comprises:
   randomly assigning the mobile message recipients to the first template and the second template based on the pre-set allocation; and
   sending mobile messages according to the first template or the second template to the mobile message recipients as randomly assigned.

7. The computer-implemented method of claim 6, wherein the assignment of each of the mobile message recipients is included within information attached to a profile of the mobile message recipient, wherein the information allows actions by the mobile message recipient to be tracked.

8. The computer-implemented method of claim 1, further comprising integrating information received from the testing with electronic marketing information.

9. The computer-implemented method of claim 8, wherein the electronic marketing information includes one or more of mobile message recipient actions, discount offers, and product purchases.

10. The computer-implemented method of claim 8, wherein integrating information received from the testing with electronic marketing information comprises using electronic marketing information to qualify the mobile message recipients for the testing, including ensuring that mobile message recipients in the testing have taken actions pertaining to other marketing actions.

11. The computer-implemented method of claim 8, wherein integrating information received from the testing with electronic marketing information comprises dynamically updating content in the templates based on actions or characteristics of the user the mobile message recipients within the electronic marketing information.

12. The computer-implemented method of claim 8, wherein integrating information received from the testing with electronic marketing information includes at least some of the test information determined during testing of the templates being used for influencing marketing information.

13. The computer-implemented method of claim 1, wherein the different content of the first template and the second template includes at least representations of the mobile message, including at least one of a text, a layout, a design, or an image, of the mobile message.

14. The computer-implemented method of claim 1, wherein each of the first template and the second template further include different behavior, wherein the different behavior includes at least one of changes of the mobile messages over time, movement of the mobile messages, or changing color or intensity of the mobile messages.

15. The computer-implemented method of claim 1, wherein selected win threshold is adaptively selected based on input or feedback from the mobile message recipients.

16. The computer-implemented method of claim 1, wherein selected win threshold is changed over time based on a detected anomaly, or pattern in the collected test data.

17. The computer-implemented method of claim 1, wherein precision threshold is preselected based on predicted or simulated false positive and false negative rates based on a number of received messages and successes.

18. The computer-implemented method of claim 1, wherein precision threshold is adaptively selected based on data from data of a particular website.

19. The computer-implemented method of claim 1, wherein determining automatically whether the first template of the mobile message has a statistical advantage over the second template of the mobile message through testing further comprises determining a volume threshold, wherein the volume threshold is preselected based on predicted or simulated false positive and false negative rates based on a number of message recipients and successes.

20. The computer-implemented method of claim 1, wherein determining automatically whether the first template of the mobile message has a statistical advantage over the second template of the mobile message through testing further comprises determining a volume threshold, wherein the volume threshold is adaptively selected based on data from data of a particular website.

21. A system for automated testing and selection of multiple templates of a mobile message, comprising:
  a marketing manager server configured to operate and manage a website;
  a plurality of mobile devices configured to receive mobile messages;
  a server electronically connected to the marketing manager sever and the plurality of mobile devices, the server configured to:
    generate at least a first template of the mobile message and a second template of the mobile message, each of the first template and the second template having at least a different send time, wherein the first template has a first send time and the second template has a second send time, wherein the first and second send times are selected at least based on prior behavior of mobile message recipients;
    assign a respective group of mobile message recipients of planned mobile message recipients to the first template of the mobile message and to the second template of the mobile message, wherein each of the planned mobile message recipients are selected based on a combination of a geolocation of the planned mobile message recipient, a purpose of the mobile message, and a recency of a last marketing mobile message received by the planned mobile message recipient;
    determine automatically whether the first template of the mobile message having the first send time has a statistical advantage over the second template of the mobile message having the second send time through testing, comprising:
      collect test data from testing including mobile message recipient actions of the first template of the mobile message and the second template of the mobile message;
      generate estimates of mobile message recipient actions for the first template and the second template including applying an analysis method to the collected test data to determine a win probability difference between a win probability for the first template and a win probability for the second template, and determine that the win probability difference is greater than a selected win threshold;
      determine that a precision of the estimates of a success rate is greater than a precision threshold; and
    send the mobile message of the first template to a remainder of the planned mobile message recipients when the first template of the mobile message is determined to have the statistical advantage over the second template of the mobile message,
    wherein determining that the precision of the estimates of the success rate is greater than a precision threshold comprises: comparing a fraction of credible intervals that are overlapping, wherein credible intervals include a range of values that the success rate is likely to fall within after accounting for random chance.

22. The system of claim 21, wherein the analysis method includes generating a win probability, wherein the win probability represents a probability that a template variation currently leading the testing has a higher success rate than other variations after accounting for random chance.

23. The system of claim 21, wherein at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the mobile message recipient actions of the first template of the mobile message and the second template of the mobile message.

* * * * *